United States Patent [19]
Dann et al.

[11] 3,971,911
[45] July 27, 1976

[54] PROJECTION FORMING OF THREE-DIMENSIONAL METAL OBJECTS

[76] Inventors: Fred M. Dann, 130 Cliff, Sun Prairie, Wis. 53590; James Reigel, 4725 Cottage Grove Road, Madison, Wis. 53716

[22] Filed: Apr. 15, 1975

[21] Appl. No.: 568,254

Related U.S. Application Data
[62] Division of Ser. No. 374,307, June 28, 1973, Pat. No. 3,892,506.

[52] U.S. Cl. ............................. 219/162; 219/10.65; 219/149; 219/121 EB
[51] Int. Cl.² ........................................ C21D 1/40
[58] Field of Search ....... 219/149, 121 EB, 121 EM, 219/121 P, 121 R, 162; 264/111; 29/419–425; 164/47–54, 65–68, 133

[56] References Cited
UNITED STATES PATENTS

| | | |
|---|---|---|
| 2,902,714 | 9/1959 | Johnson .................... 425/174.8 E X |
| 3,323,888 | 6/1967 | Searight et al. ............. 219/121 P X |
| 3,578,739 | 5/1971 | George ...................... 425/174.8 E X |
| 3,598,944 | 8/1971 | Weimar et al. ......................... 219/76 |
| 3,851,023 | 11/1974 | Brethauer et al. ........ 425/174.8 E X |

*Primary Examiner*—J. V. Truhe
*Attorney, Agent, or Firm*—Andrus, Sceales, Starke & Sawall

[57] ABSTRACT

Metallic particles are heated to a coherent bonding state, are provided with an electric charge and accelerated into and through an evacuated chamber. Means associated with the chamber continuously control the directional path of the moving particles in accordance with the shape of the article to be formed. The projected particles then impinge upon a target at one end of the chamber to build up the three-dimensional object desired.

8 Claims, 10 Drawing Figures

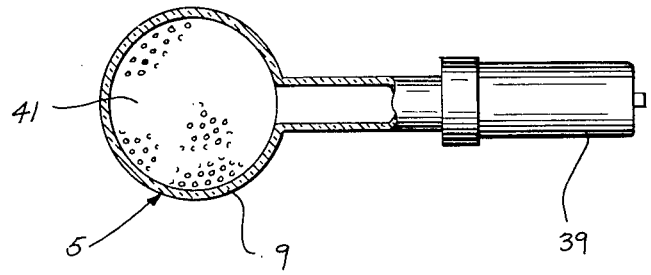
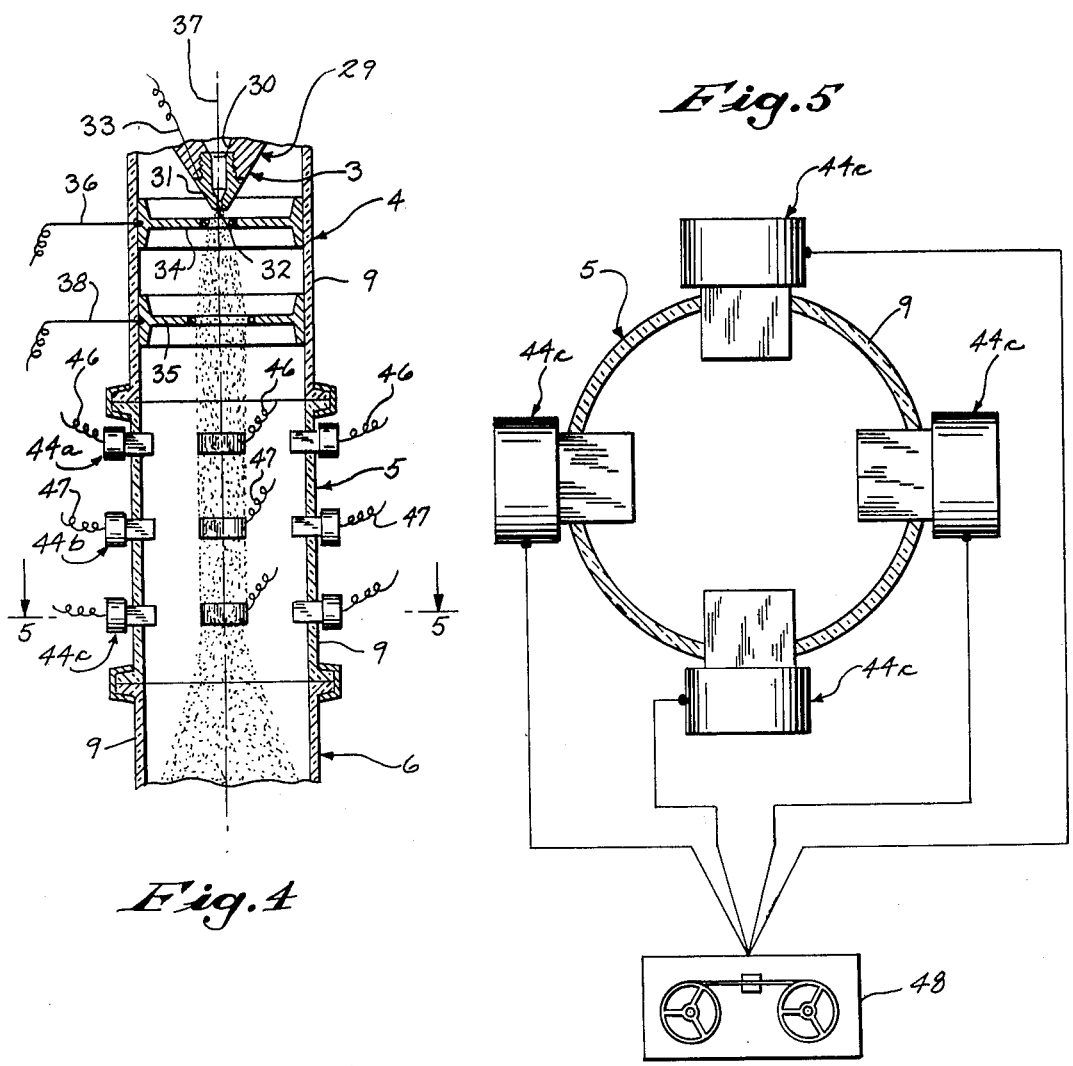

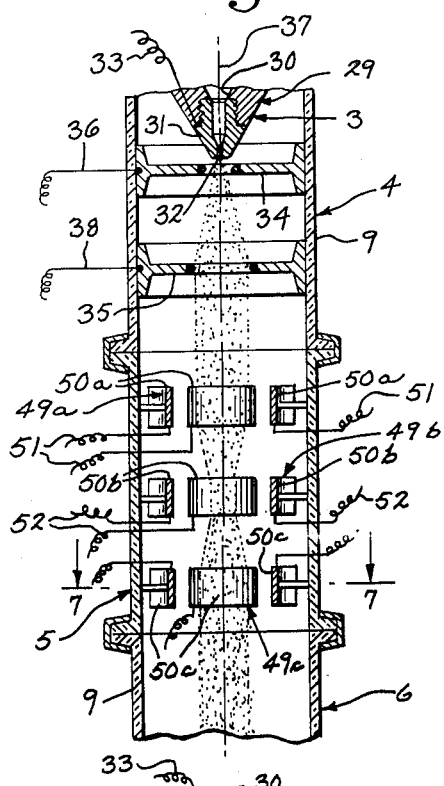
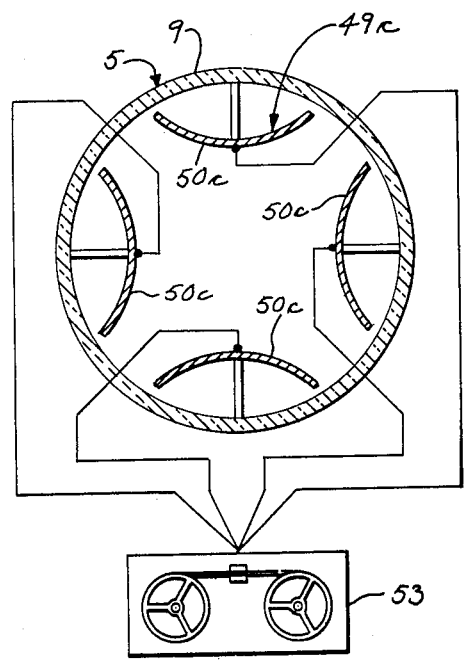
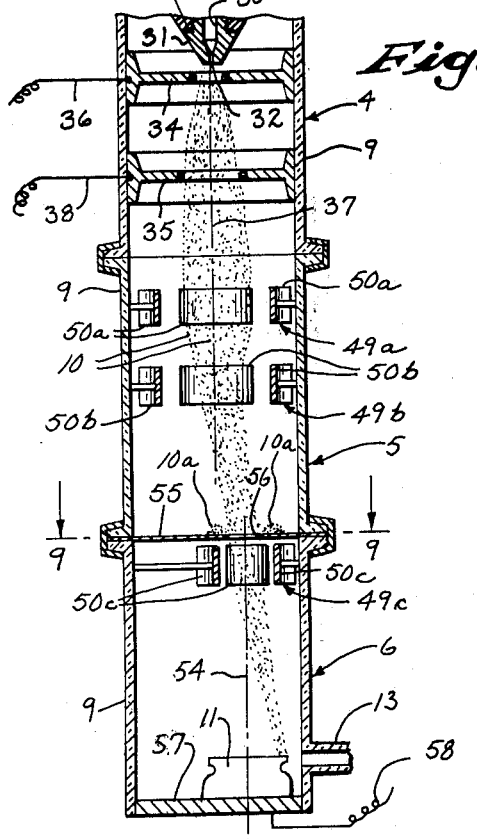
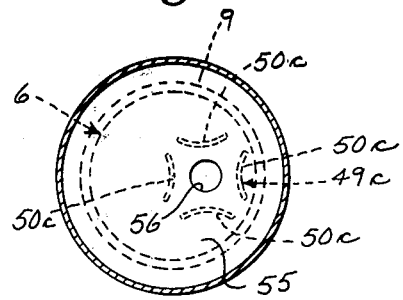
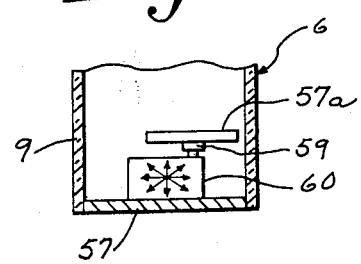

PROJECTION FORMING OF THREE-DIMENSIONAL METAL OBJECTS

This is a division of application Ser. No. 374,307, filed June 28, 1973 now U.S. Pat. No. 3,892,506.

BACKGROUND AND SUMMARY OF THE INVENTION

This invention relates to projection forming of three-dimensional metal objects.

In the present art of forming metal into various geometric forms, molding and casting processes are usually utilized. These processes require expensive tooling and dies, and are time consuming and expensive from the labor standpoint as well. Furthermore, and referring especially to casting, difficult problems occur with gas inclusions, segregation and distortion.

Some formation of geometric metal pieces is also done by weld fabrication techniques, such as fusion welding, but these techniques are also subject to numerous disadvantages such as those mentioned above in regard to casting.

Furthermore, all present forming of three-dimensional metal objects is subject to severe tolerance limitations so that uniform forming of complex shapes within very small tolerances is very difficult, if not impossible.

The present invention solves the aforementioned and other problems and provides an extremely unique concept of three-dimensional metal object formation.

Broadly in accordance with the invention, metallic particles are heated to a coherent bonding state, are provided with an electric charge and accelerated into and through an evacuated chamber. Means associated with the chamber continuously control the directional path of the moving particles in accordance with the shape of the article to be formed. The projected particles then impinge upon a target at one end of the chamber to build up the three-dimensional object desired.

DESCRIPTION OF THE DRAWINGS

The accompanying drawings illustrate the best mode presently contemplated by the inventors for carrying out the invention.

In the drawings:

FIG. 3 is a transverse sectional view taken on line 3—3 of FIG. 1;

FIG. 4 is a fragmentary schematic longitudinal sectional view showing one form of quadrupole control means;

FIG. 5 is a transverse sectional view taken on line 5—5 of FIG. 4;

FIG. 6 is a view similar to FIG. 4 and showing another form of quadrupole control means;

FIG. 7 is a transverse sectional view taken on line 7—7 of FIG. 6;

FIG. 8 is a fragmentary schematic longitudinal sectional view showing the steerability test and particle removal apparatus;

FIG. 9 is a transverse sectional view taken on line 9—9 of FIG. 8; and

FIG. 10 is a fragmentary view showing a movable target.

DESCRIPTION OF THE PREFERRED EMBODIMENT

Figures 1, 2:
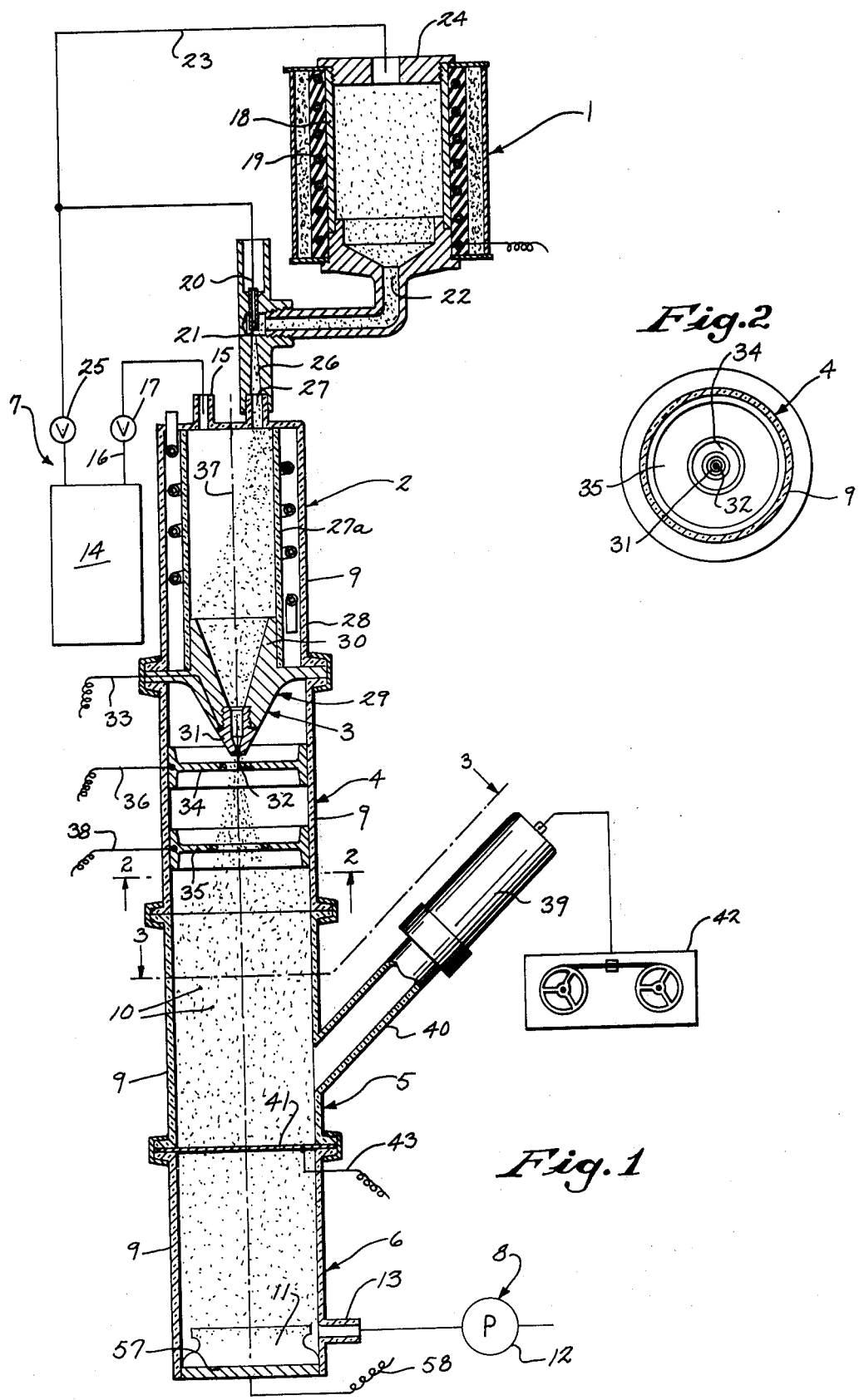
FIG. 1 is a schematic longitudinal sectional view of projection forming apparatus constructed in accordance with the concepts of the invention.
FIG. 2 is a transverse sectional view taken on line 2—2 of FIG. 1.

As shown in FIGS. 1–3 of the drawings, the projection forming device primarily comprises a storage and inject stage 1, an induction stage 2, a particle charging stage 3, an accelerator stage 4, a planular image generation stage 5, and an impingement stage 6. In addition to the above stages, the device includes a backflow gas supply system 7 and an evacuating system 8.

Stages 2 thru 8 are preferably disposed in a vertical assembly of axially aligned tubular high strength pipes 9 which are sealed together in any suitable way to form a columnar chamber. Pipes 9 may be made of glass or any other suitable material.

The invention contemplates taking a supply of discrete metallic particles 10 at storing stage 1 and forming the particles into a three-dimensional object 11 at impingement stage 6. The particles are preferably in the form of a fine metal powder with a ferrous or other similar suitable content.

To prevent interference with the process by reactive atmospheric constituents, such as oxygen, the longitudinal chamber assembly is first evacuated. For this purpose, evacuation system 8 comprises a suitable vacuum pump 12 which is attached to an outlet 13 in the downstream pipe 9. Other pumps in other positions within the column may be utilized to obtain the desired results. In addition, it is desirable to purge any reactive atmospheric elements not removed by pump 12. For this purpose, backflow supply system 7 comprises a tank 14 or other suitable slightly pressurized source of inert backfilling gas, such as Argon. Tank 14 is connected to an inlet 15 to induction stage 2, as by a gas line 16 having a control valve 17 therein.

At storage and inject stage 1, metal particles 10 are held within a hopper 18 and preheated by a suitably actuated heater coil 19. This pre-heating speeds up subsequent treatment of the metal at induction stage 2 and reduces oxides and other impurities in the metal which may affect the final product.

Means are provided in conjunction with storage and inject stage 1 to inject a continuous stream of particles 10 from hopper 18 into induction stage 2. For this purpose, a siphon system including a tube 20 having a restricting discharge orifice 21 is disposed closely adjacent the discharge port 22 of hopper 18. Gas tank 14 is connected via a dual line 23 to the inlet of tube 20 as well as the inlet end 24 of hopper 18. A valve 25 in line 23 controls the flow of gas into hopper 18 and tube 20. Opening of valve 25 causes gas to flow into hopper 18 for purging and equalizing of the vacuum condition. Furthermore, gas flowing through orifice 21 in combination with the vacuum will cause a high speed flow of particles 10 from hopper 18 through a nozzle 26 and aspirating injection thereof into stage 2 through a second inlet 27.

Induction stage 2 contains a ceramic-like tubular structure 27a surrounded by a suitably actuated induction coil 28 for purposes of heating particles 10 injected from stage 1. At this point it is desirable to heat the particles to a coherent bonding state which is a near molten or plastic-like condition.

The combination of gravity and inject speed and thermal motion will now carry the plasticized or molten metal particles through the tubular induction chamber to particle charging stage 3. This stage is shown as comprising a generally cone-shaped stripper nozzle 29 having a main body portion 30 of non-conducting ceramic material or the like, and a tip portion 31 of an electrically conducting material capable of withstanding the high temperature of the heated particles 10. Tip portion 31 has a small orifice 32 for passage of the particles therethrough.

Stage 3 is provided with means to induce a positive charge on particles 10 as they funnel therethrough. For this purpose, a charging wire 33 is connected to tip 31 and is suitably provided with a high positive D.C. potential. The charged tip 31 thus charges particles 10, so that they take on a positive charge as they flow onward to accelerator stage 4.

Stage 4 positions the flow of particles 10 and acceleratingly projects them forwardly. For this purpose, a plurality such as a pair of metallic rings, 34, 35 are mounted in pipe 9 downstream from nozzle 29. Ring 34 is disposed closely adjacent nozzle 29 and is electrically grounded, as through a wire 36. It functions to center the flow of positively charged particles 10 and direct them on a discrete path along or parallel to the straight longitudinal axis 37 of the columnar assembly. Ring 35 is on the side of ring 34 remote from nozzle 29 and is suitably provided with a high negative D.C. potential, as through a wire 38. Ring 35 has a larger central opening than ring 34 and functions to accelerate particles 10 beyond their initial velocity to a higher velocity.

The charges on tip 31 and rings 34, 35 depend upon variables such as: magnitude of particle charge; size, mass and composition of particle; as well as velocity and other factors.

The accelerated particles, now traveling at high speed, next enter planular image generation stage 5. At this stage, the particles are re-aligned into a continuously variable two-dimensional image corresponding at any one instant with the desired planular configuration of the final object 11 at any one place. For this purpose, and in the embodiment shown in FIGS. 1–3, the image generator comprises an electron gun 39 mounted in a cylindrical arm 40 extending angularly from the column downstream from stage 4. Gun 39 may be of the video tube type and projects an electron image onto a matrix 41 disposed across the columnar chamber and in the path of particles 10. Gun 39 is controlled to project a continuous series of two-dimensional electronic images onto matrix 41 and which may continuously change to prescribe, through a lapse of time, the complete three-dimensional form of the final object 11. For this purpose, a suitable video tape input unit 42 or similar signal generator is connected to the input of gun 39. The tape thereon is recorded with programmed signals simulating the image of each plane to be formed in object 11 and which continuously change based upon non-uniformity in planular configuration.

Matrix 41 comprises a perforated sheet of steel or the like which is electrically induced with a high frequency low amplitude sinusoidal signal superimposed upon a positive constant D.C. voltage, as by a wire 43. The characteristics of the charge depend upon variables such as the intensity of the electron beam from gun 39 and the variables mentioned heretofore. Projection of the electron beam by gun 39 will selectively "open" and "close" the various matrix openings, electrically speaking, to permit or prevent passage of particles 10 therethrough. Thus, at any given instant a planular image simulating a plane to be formed in object 11 will be imposed on the particles by selectively allowing them to pass through matrix 41 in discrete positions for projection toward the target.

The embodiment of FIGS. 1–3 incorporates a planular image generation system of the matrix type. Alternate systems may be used and which embody the quadrupole concept. Two quadrupole embodiments will now be described.

In the embodiment of FIGS. 4 and 5, a plurality of sets 44a, 44b and 44c of electromagnets are spaced longitudinally along the chamber and downstream from rings 34, 35. These sets comprise a plurality, such as four, of electromagnets 45a, 45b and 45c respectively, which are annularly spaced peripherally on the chamber and particle path and with their poles extending slightly thereinto.

The first and second sets 44a, 44b of electromagnets 45a, 45b are connected through wires 46, 47 to suitable well-known control mechanism, not shown, which imposes a D.C. magnetic field upon the quadrupole in a manner to center and focus the stream of particles generally along axis 37. The third set 44c of electromagnets 45c is downstream from the focusing sets and is connected to a signal control tape unit or signal generator 48, somewhat similar to unit 42, which varies the magnetic field between the magnets to deflectingly steer or scan the stream of particles transversely, to thus create the planular image desired.

In FIGS. 6 and 7, the sets of electromagnets are replaced with a plurality of sets 49a, 49b and 49c of curved electrostatically chargeable plates 50a, 50b and 50c. Sets 49a and 49b are connected through wires 51, 52 to suitable well-known control mechanism, not shown, which imparts a suitable charge in a manner to center and focus the stream of particles generally along axis 37. Third set 49c is connected to a suitable signal generator such as tape unit 53, which functions similar to unit 48.

In some instances, a few of the particles 10 in the stream may not be properly responsive to the steering control of the quadrupole units of FIGS. 4–7. This may be due to a number of factors, such as the existence of a few particles in the stream which are of the wrong mass, charge or density. These undesirable particles can be effectively eliminated by means to test the steerability of all the particles in the stream, together with means to eliminate those particles which do not properly respond to the steering control. These means can be utilized in conjunction with either of the quadrupole embodiments described above, but will be described here only in connection with the electrostatic concept.

FIGS. 8 and 9 show a portion of a projection forming apparatus somewhat similar to FIGS. 6 and 7. However, in this instance the third set 49c of annularly arranged plates 50c is offset from around main axis 37 and forms a supplemental axis 54. In addition, sets 49a and 49b act as electromagnetic focusing lenses and are controlled to steer the stream of particles 10 laterally away from axis 37 and into conjunction with axis 54 just upstream from plates 50c. At this point, a plate 55 is disposed transversely across the chamber, and is provided with an aperture 56 substantially smaller than the distance between opposite plates 50c. Those particles 10 which properly respond to the offset steering forces of sets 49a and 49b will pass through the aperture, while those individual particles 10a which do not respond properly will engage plate 55 itself and not progress further. Since the object 11 will, in this case, be projection formed from a stream of more accurately controlled particles, it will be of higher quality.

It is contemplated that any embodiment of planular image generator can be programmed to prescribe an infinite number of shapes an infinite number of times.

Now that particles 10 have been heated, given a charge, velocity, and selected path, they proceed to the final (impingement) stage 6. For this purpose, the downstream end of the columnar assembly is closed by a support plate 57 suitably secured thereto by clamps (not shown) or any other desired means. Plate 57 comprises the target against which particles 10 initially impinge; but after particles form the initial layer, subsequent particles impinge and build upon them to form a metallurgically bonded three-dimensional object 11.

If desired, plate 57 may be grounded, as by a wire 58, to dissipate any charge on the particles. It may even be desired to provide a negative charge to plate 57 to assure final particle flow in a direction normal to the plane of the plate.

The impact velocity combined with the plasticity of the heated particles will assure metallurgical bonding to any desired density throughout object 11, in view of the controlled plastic impaction that takes place.

In some instances, it may be desirable to combine the planular image generation concept with a movable target. As shown in FIG. 10, target 57a is mounted on a support 59 within the chamber. Support 59 is moved by any well-known servo-controlled motor system 60 to move the target in the X, Y and Z directions, as well as to index or tilt the target.

The continuously variable projection concept of the invention permits the relatively fast manufacture of simple and complex metallic shapes. Part edges, undercuts, sides and planes can be built up with exacting tolerances, limited only by the metal particle size.

Various modes of carrying out the invention are contemplated as being within the scope of the following claims particularly pointing out and distinctly claiming the subject matter which is regarded as the invention.

We claim:
1. A process for projection forming of a three-dimensional object from metallic particles such as metal powder and the like, comprising the steps of:
   a. forming a moving stream of the said particles,
   b. heating said stream of particles to a coherent bonding state,
   c. continuously imposing a variable two-dimensional planular image on the stream of heated particles,
   d. and subsequently causing said particles to impinge on a target and build up a three-dimensional object corresponding in shape to the image continuously imposed in step (c).

2. The process of claim 1 which is conducted in a columnar chamber, and which includes the steps of:
   a. evacuating said chamber of essentially all reactive atmospheric elements,
   b. and backfilling and purging said chamber with inert gas.

3. The process of claim 1 which includes the step of: imparting a positive charge to said stream of particles prior to the imposition of said planular image.

4. The process of claim 1 which includes the step of: directing the flow of particles along a discrete generally straight path and subsequent to the said heating step.

5. The process of claim 1 which includes the step of accelerating said particles to a higher velocity subsequent to said heating step.

6. The process of claim 1 which includes the step of focusing said stream of particles prior to step (c).

7. The process of claim 1 which, prior to step (c), includes the steps of:
   a. steering said stream of particles in a lateral direction to test the steerability of individual particles,
   b. and removing those particles from said stream which lack the desired steerability.

8. An article of manufacture formed by the process of claim 1.

* * * * *